May 8, 1945. A. K. LYLE 2,375,482
APPARATUS FOR COATING GLASS ARTICLES
Filed Jan. 24, 1941 2 Sheets-Sheet 1
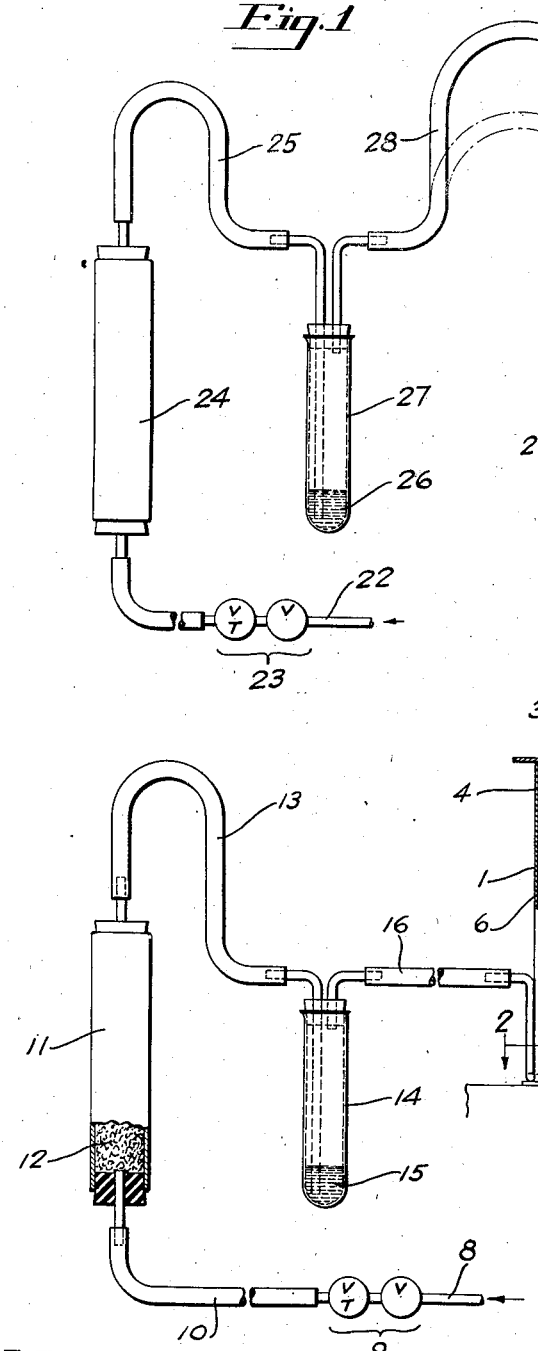
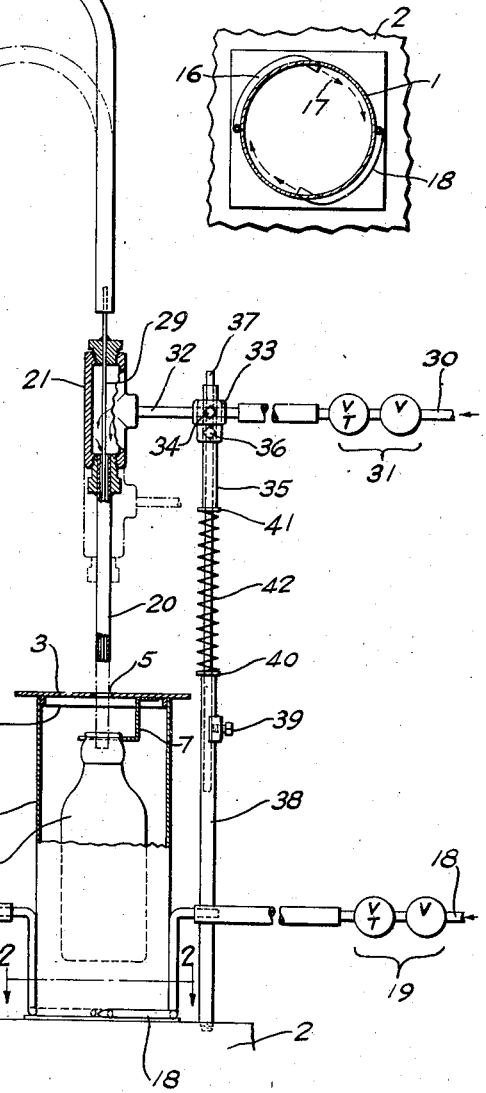
Witness:
B. X. Bartman
Inventor
Aaron K. Lyle
by Brown & Parham
Attorneys May 8, 1945. A. K. LYLE 2,375,482
APPARATUS FOR COATING GLASS ARTICLES
Filed Jan. 24, 1941 2 Sheets-Sheet 2
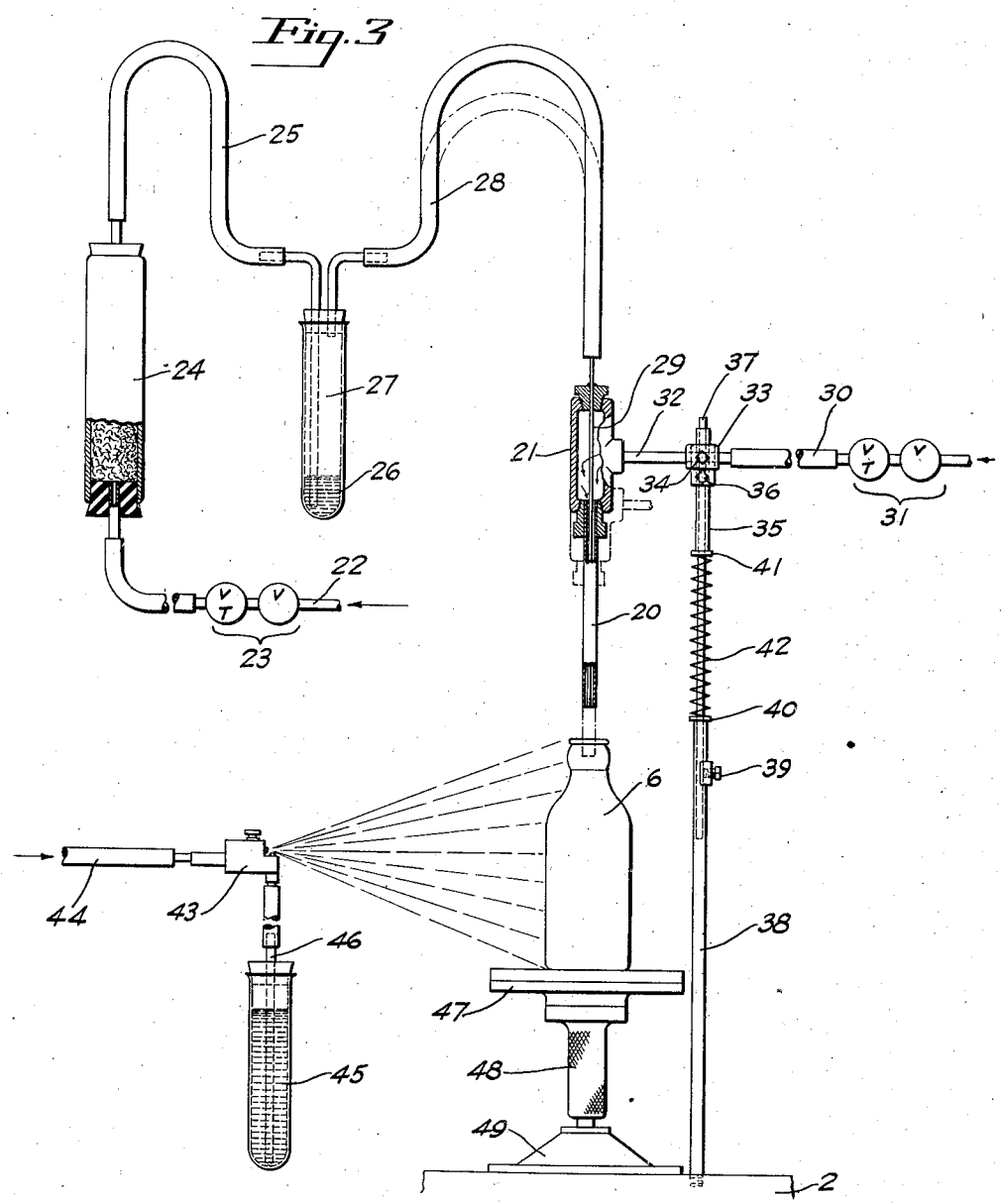
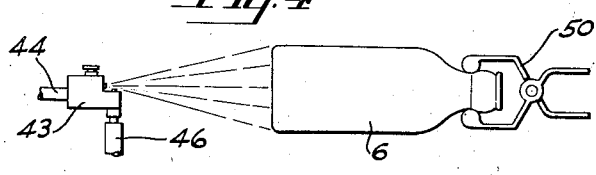
Witness:
B. X. Bartman
Inventor
Aaron K. Lyle
by Brown & Parham
Attorneys Patented May 8, 1945

2,375,482

UNITED STATES PATENT OFFICE 2,375,482

APPARATUS FOR COATING GLASS ARTICLES

Aaron K. Lyle, West Hartford, Conn., assignor to Hartford-Empire Company, Hartford, Conn., a corporation of Delaware Application January 24, 1941, Serial No. 375,834

8 Claims. (Cl. 91—18)

The present invention relates to an apparatus for producing a coating upon a glass article, such as a bottle or other container.

The coating porduced by use of apparatus of the invention is what may be termed an "iridizing" coating in that if the coating is thick enough, the coated glass article is more or less iridescent.

Among the objects of the invention, therefore, is to provide relatively simple apparatus by which such a coating may be produced on a glass article, such as a bottle or other container.

Other objects and advantages of the present invention will become apparent from the following description and the accompanying drawings and are pointed out in the appended claims.

In the drawings:

Figure 1 is a diagrammatic illustration partly in elevation and partly broken away and in vertical section illustrating an apparatus for coating glass bottles on both their exterior and interior surfaces in accordance with the present invention;

Fig. 2 is a transverse horizontal section taken substantially on the line 2—2 of Fig. 1;

Fig. 3 is a view similar to that of Fig. 1 showing interior coating as in Fig. 1 and exterior coating by the application of a spray to the container; and Fig. 4 is a diagrammatic illustration showing the application of treating material as a spray to the bottom of a glass bottle.

An embodiment of the invention, including apparatus for making use of a liquid treating material, to be conveyed as a vapor to the proximity of the article to be treated by a stream of dried air is illustrated in Figs. 1 and 2. Referring to these figures, there is provided a casing or shield 1 suitably supported upon a base 2 and arranged to be closed at its upper end by a cover 3, the cover having a downwardly extending flange 4 fitting within the upper end of the shield 1 and positively locating the cover upon the shield. The shield 1 and cover 3 jointly serve to confine a glass article, such as a bottle, during the treatment thereof, and substantially to separate such article from the surrounding atmosphere, the cover 3 being imperforate except for a single aperture 5 at the center thereof through which a nozzle is introduced, as hereinafter described, for the introduction of treating material and air into the interior of an article.

A glass article, here shown as a bottle 6, is preferably suspended from the cover 3 by means of a suitable bifurcated bracket 7 arranged to embrace the glass article at the finish or lip portion thereof as shown. The bottle is supported so that its bottom is spaced above the bottom of the shield 1 to permit the coating of the entire exterior surfaces of the sides and bottom simultaneously, so as to coat the entire exterior surface substantially uniformly and at a single operation as hereinafter set forth.

Means are provided for supplying to the interior of the shield 1 a predetermined and controllable amount of air laden with the vapor of a liquid chemical treating material. For this purpose air under a suitable selected pressure is supplied from a suitable source (not shown) through a pipe 8 under the control of suitable valve means 9, in the present instance comprising an off-and-on type of valve V and a throttling type of valve $$\begin{matrix}V\\T\end{matrix}$$

Leading from the valve means 9 is a passage 10 which may be flexible as shown, and which conducts the air to the lower end of a chamber 11 containing a suitable moisture-absorbing material 12, such as calcium chloride (CaCl$_2$) and/or a commercial material used for this purpose and known as "dehydrite." The function of this chamber and the contents thereof is to reduce the moisture content of the air passing therethrough to a desired extent. The dried air passes from the upper end of the chamber 11 through a pipe 13 to a point adjacent to the bottom of a chamber 14. In the chamber 14 is contained the liquid treating material, shown at 15, which material, in accordance with the present invention, may be stannic chloride (SnCl$_4$) or titanium chloride (TiCl$_4$), or a mixture of the two. The dried air bubbling up through or otherwise coming into contact with the liquid material 15 carries along with it the vapor of the liquid, which passes from the chamber 14 through a pipe 16 to the interior of the shield 1. As shown, Fig. 2, the pipe 16 is directed into the bottom portion of the interior of the shield 1 in a tangential manner, as indicated by the arrows at 17. This makes for a uniform distribution of the treating vapor within the shield 1 about the bottle 6 to be coated.

As the vapor introduced into the shield 1, as just described, is quite rich in treating material and would tend to produce a relatively thick coating upon the glass article being treated, it is desired that means be provided to control the thickness of the coating applied to the glass article. This may be done in several ways. The thickness of the coating applied is dependent upon several factors, among which are the concentration of the chemical treating material or materials employed, the time which the glass article is exposed to such treatment and the temperature of the glass article at the time it is treated. In practice, in accordance with the present invention, the amount of treating material supplied to the proximity of the article to be treated is determined by the valve means 9, which is preferably operated automatically in a commercial installation as hereinafter set forth, so that the time the valves of such means are open and the degree of opening are adjustable. Another practical way of controlling the concentration of the treating material is to control the dilution of the vapor-laden air in proximity to the article. For this purpose, a second air line 18 is provided leading from a suitable source of supply (not shown) of relatively moist air under pressure and having included therein a valve means 19 including valves V and $$\frac{V}{T}$$

similar to those previously described, the pipe 18 leading as shown in Fig. 2 into the interior of the shield 1 and preferably also being so arranged as to introduce air thereinto in a direction tangential of the shield and so as to cause a swirl therein in the same direction as that of the vapor-laden air, as shown in Fig. 2. By a suitable control of the amount of vapor-laden air and the absolute and relative amount of diluting air supplied through the pipe 18, it is possible to control the thickness of the coating applied on the outside surface of the glass article 6. Also, after the supply of vapor-laden air has been cut off, it is possible, by a continued application of air through the pipe 18, to scavenge from the interior of the shield 1 any excess of treating material and thus to prevent what appears on the bottle as a cloudy coating. This cloudy coating is, however, not permanent, as is the coating which has been previously described, and may easily be washed off. Thus, the scavenging action is not absolutely necessary, but merely serves to obviate the necessity for a subsequent washing of the bottles under certain circumstances.

It has been found that if the bottles are treated shortly after the completion of the forming operation thereof, that is, shortly after they emerge from the final molds of the machine in which they are formed, the desired coating can be applied. The time interval between the removal of the article from the mold and the treating operation may be of the order of magnitude of 15 seconds to one minute, although these times are not necessarily critical. The upper limit of the desired temperature range is approximately that at which a glass article emerges from the mold in which it is formed. The lower limit thereof is approximately the lower annealing temperature.

For treating or coating the interior surface of a hollow glass container, such as the bottle 6, there is provided a nozzle generally indicated at 20 mounted in a head 21 and supplied with both vapor-laden air and with relatively moist air by means which may be the same as or similar to those previously described. As shown, air under pressure may be supplied from a suitable source (not shown) through a pipe 22 under control of a valve means 23, including a pair of valves V and $$\frac{V}{T}$$

to a drying chamber 24 corresponding to the chamber 11. It will be understood that the valves V and $$\frac{V}{T}$$

may be similar or have similar functions to the correspondingly designated valves of the valve means 9. A pipe or passage 25 leads from the upper portion of the chamber 24 to a point normally below the level of the liquid treating material 26 in a chamber 27. A pipe or passage 28 including a flexible portion leads from the upper portion of the chamber 27 to the head 21, through which it passes in a small diameter pipe 29 forming the interior member of the nozzle 20.

Relatively moist air is supplied for diluting and scavenging purposes through a passage 30 from a suitable source (not shown) under control of a valve means 31 including valves V and $$\frac{V}{T}$$

similar to the correspondingly marked valves previously described, the pipe 30 communicating with a rigid pipe 32, which in turn communicates with the interior of the head 21 and serves to support this head, as hereinafter described. The interior of the head 21 communicates through an annular space within the nozzle 20 between the pipe 29 and an outside pipe of the nozzle with an opening at the lower end of the nozzle.

Thus, the vapor-laden air cannot come into contact with the relatively moist air supplied through the pipe 30 until both streams of air have emerged from the nozzle 20. This is important as the treating material is hydrolyzable, as hereinafter set forth, so that if it were permitted to come into contact with relatively moist air, the hydrolysis which would set up would result in the formation of oxides or hydroxides of the metallic component of the treating material which would serve to clog the relatively small pipes or passages through which the vapor-laden air is passed.

In the apparatus shown diagrammatically in Fig. 1, the pipe 32 is supported in a bracket 33 and is held therein by a suitable set screw 34. The bracket 33 is suitably vertically adjustably secured to a hollow sleeve 35 by a set screw 36. The sleeve 35 is vertically slidable upon a rod 37 which is mounted in a longitudinal bore or hole in a supporting member 38 and is held therein by a set screw 39. The member 38 is suitably secured in the base 2. At its upper end, the pipe 38 has a flange 40. The lower end of the sleeve 35 is provided with a similar flange 41. Extending between these two flanges is a compression spring 42.

The operation of the apparatus of Figs. 1 and 2 is as follows. At the start of the process, the shield 1 is empty and open at its upper end, the head 21 and nozzle 20 are swung to one side about the axis of the rod 37. With the parts in this position, a hot bottle or container to be coated is placed manually in the bracket 7 of the cover 3 and the cover carrying the bottle, placed in the position shown in Fig. 1. The head 21 and the nozzle 20 are then swung about the axis of the rod 37 until the nozzle 20 is aligned with the aperture 5 in the cover 3. The pipe 32 carrying the head 21 and the nozzle 20 is then depressed, for example, to the position indicated in dot and dash lines in Fig. 1. The parts are now in readiness for the coating of the bottle. At this time the valves V in the pipes 8 and 22 are opened for a predetermined and preferably adjustable period of time to permit a certain amount of the vapor-laden air to pass inside the shield 1 and inside the bottle respectively. During the supplying of vapor-laden air, as just described, a desired flow of relatively moist air is passed into the shield and into the interior of the bottle through the pipes 18 and 30 under the control of the valves in these pipes. This flow is controlled in order that the vapor-laden air be diluted to a desired extent to produce coatings on the inside and outside of the bottle of desired thicknesses. It will be understood that the process thus far described may advantageously be used for coating the inside or outside or both surfaces of a glass container.

After the supply of vapor-laden air has been cut off, more air may be supplied either at the same or different rates through the pipes 18 or 30, or both, to scavenge excess coating material from the inside of the bottle or from the inside of the shield 1 surrounding the bottle, or both.

After the bottle has been coated as aforesaid, the pipe 32 may be released, so as to permit the spring 42 to lift the head 21 and the nozzle 20 upwardly, for example to the position shown in Fig. 1. The head and the nozzle can then be swung laterally to their initial positions and the cover 3 carrying the bottle 6, removed from the shield 1, permitting the bottle to be removed to a suitable delivery point.

While there is shown and described in Figs. 1 and 2 an apparatus for carrying on the process of the present invention on a laboratory scale and with laboratory type apparatus, for example, the chambers 14 and 27 being shown as glass test tubes, it will be understood that the equivalent apparatus on a larger and/or commercial scale may be employed for carrying out the same process in a commercial manner, certain operations described in respect to Fig. 1 as being effected manually, being done commercially in some suitable automatic manner. For example, it is contemplated that the placing of bottles in a casing corresponding to the shield 1 will preferably be effected automatically and in recurring cycles. The operation of the valves in supplying vapor-laden air and/or the relatively moist air may also be effected mechanically in a commercial type of apparatus, so as to predetermine the treatment of each article and to give each article of a series exactly the same type of treatment. Any suitable means for carrying out the process are to be considered as within the purview of this invention.

In Figs. 3 and 4 there is illustrated diagrammatically an apparatus by which the external surface of a bottle or other glass container may be coated by a process including a spraying operation, this being an example of the use of treating materials which may be solid at room temperatures and which may be used in solution. The apparatus for coating the inside of the bottle is shown substantially the same as that previously described in respect to Fig. 1, the parts having been given the same reference numbers for this reason. The description of this portion of the apparatus and the associated process will not, therefore, be repeated.

Referring now to Figs. 3 and 4 and more particularly to the spraying means illustrated in those figures, there is shown in Fig. 3 a spray nozzle 43 which may be of any suitable type and which is supplied with air under pressure through a pipe 44. A predetermined solution of a desired coating material may be contained within a chamber 45, here shown as a glass test tube. Leading from a point adjacent to the bottom of the chamber 45 and normally below the level of the solution therein is a pipe 46, as shown. The solution is sprayed on the outside of the glass container 6, which in the embodiment of the invention shown in Fig. 3 rests upon a rotatable table 47. The table 47 is provided with a knurled lower extension 48 and is suitably mounted for rotation on and in respect to a base 49 resting on and/or secured to the base 2. It will be understood that the table 47 may be manually rotated by grasping the knurled portion 48 thereof so as to rotate the bottle during the spraying thereof, as shown in Fig. 3. This will coat the lateral sides but not the bottom of the bottle. For coating the bottom, the bottle 6 may be grasped in a suitable way as by tongs 50, Fig. 4, and exposed to the spray from the nozzle 43 as shown in that figure. Any suitable means by which the treating liquid may be sprayed onto the side and bottom of the outside surface of a container is to be considered within the purview of this invention.

The solution within the chamber used as a spraying solution may, as set forth hereinabove, be a solution of either a liquid or a solid chemical material, such as a metallic compound in any suitable solvent.

I claim:

1. Apparatus for applying coatings to glass containers to improve the characteristics thereof, comprising a chamber for moisture-absorbing material, a chamber for an inorganic liquid coating material, a passage for conducting air from the first-named chamber to the interior of the second-named chamber at a level in the latter below the level of the liquid coating material therein, a passage leading from the upper portion of the second-named chamber above the level of the liquid coating material therein for conducting vapor-laden air from said second-named chamber to a point adjacent to a hot glass container to be coated, means to supply air under pressure to said first-named chamber, and means for applying said vapor-laden air to said hot glass container.

2. Apparatus for coating both the interior and exterior surfaces of a glass container simultaneously to improve the characteristics thereof, comprising a casing formed to provide a substantially closed space therewithin, means to suspend a glass container, while hot, within said casing so that the container is spaced from the inner walls of said casing, means for passing predried air into contact with a liquid coating material and to direct vapor-laden air thus obtained into the interior of the glass container and into the space within said casing surrounding said glass container, independent means for supplying relatively moist air to the interior of the glass container within said casing and to the space within the casing surrounding said glass container, and means for independently controlling the respective means for supplying vapor-laden air and relatively moist air both to the interior of the glass container and to the space within said casing surrounding said glass container.

3. Apparatus in accordance with claim 1, in combination with independent passage means for simultaneously supplying relatively moist air to the interior of the glass container.

4. Apparatus for applying coatings to glass containers to improve the characteristics thereof, comprising a chamber for moisture absorbing material, a chamber for an inorganic liquid coating material, a passage for conducting air from the first-named chamber to the interior of the second-named chamber at a level in the latter below the level of the liquid coating material therein, a passage leading from the upper portion of the second-named chamber above the level of the liquid coating material therein to a point adjacent to a hot glass container to be coated, said passage extending into the interior of said glass container, means to supply air under pressure to said first-named chamber, valve means for regulably controlling the amount of vapor-laden air supplied by said last-named passage to the interior of the glass container in a given period of time, independent passage means for simultaneously supplying relatively moist air to the interior of the glass container and means for regulably controlling the supply of relatively moist air to the interior of the container by said independent passage means.

5. Apparatus for applying a coating onto the exterior surface of a glass container, comprising a casing constructed and arranged to form a substantially closed chamber, means to suspend a glass container, while hot, within said casing in spaced relation with the walls thereof, a chamber for moisture-absorbing material, a chamber for a liquid coating material, means for supplying air under pressure to the chamber for moisture absorbing material, means for conducting dried air from the chamber for moisture absorbing material to the chamber for a liquid coating material so as to bring the dried air into contact with liquid coating material in the last-named chamber, and a passage for conducting vapor-laden air from the upper portion of the chamber for liquid coating material to the interior of said casing in which said glass container is suspended.

6. Apparatus in accordance with claim 5, comprising in addition a separate passage for supplying relatively moist air to the interior of said casing.

7. Apparatus in accordance with claim 5 comprising in addition a separate passage for supplying relatively moist air to the interior of said casing, valve means controlling said means for supplying air under pressure to said chamber for moisture absorbing material, and other valve means for controlling flow of moist air through said separate passage.

8. Apparatus in accordance with claim 5, comprising in addition a separate passage leading to the interior of said casing for supplying relatively moist air thereto and wherein the passage for conducting vapor-laden air and the separate passage for supplying relatively moist air to the interior of said casing both communicate tangentially with the latter to cause swirling movements of the air within the casing.

AARON K. LYLE.